United States Patent [19]

Chen

[11] Patent Number: 5,203,229

[45] Date of Patent: Apr. 20, 1993

[54] QUICK-RELEASE CLIPLESS PEDAL WITH TWO CLEAT ENGAGING SIDES

[76] Inventor: Chung-I Chen, No. 3, Kung-Chi Rd., Yu-Shih Industry Dist., Ta-Chia Chen, Taichung Hsien, Taiwan

[21] Appl. No.: 875,033

[22] Filed: Apr. 28, 1992

[51] Int. Cl.⁵ ........................ B62M 3/08; G05G 1/14
[52] U.S. Cl. ................... 74/594.6; 74/594.4; 36/131
[58] Field of Search ............ 74/560, 594.1, 594.4, 74/594.6; 36/131, 132, 134

[56] References Cited

U.S. PATENT DOCUMENTS

| | | | |
|---|---|---|---|
| 4,928,549 | 5/1990 | Nagano | 74/594.6 |
| 4,942,778 | 7/1990 | Bryne | 74/594.6 |
| 5,003,841 | 4/1991 | Nagano | 74/594.4 |
| 5,048,369 | 9/1991 | Chen | 74/594.6 |
| 5,081,883 | 1/1992 | Romano | 74/594.6 |
| 5,131,291 | 7/1992 | Beyl | 74/594.6 |

FOREIGN PATENT DOCUMENTS

| | | | |
|---|---|---|---|
| 428140 | 5/1991 | European Pat. Off. | 74/594.6 |
| 2-128987 | 5/1990 | Japan | 74/594.4 |

Primary Examiner—Richard Lorence

[57] ABSTRACT

A quick-release clipless pedal includes a cleat to be secured to a shoe sole and a pedal body to be mounted on a pedal shaft and releasably retaining the cleat. The cleat has first and second engaging parts respectively formed on front and rear ends thereof. The pedal body includes a frame portion and a tubular portion which partitions the frame portion in a transverse direction. The tubular portion receives one end of the pedal shaft. The frame portion has front and rear ends respectively formed with an opening. The pedal body further includes a pair of cleat engaging members respectively provided on upper and lower sides of the tubular portion and respectively having a claw portion to receive releasably the first engaging part of the cleat, and a pair of retaining units revertably engaging the second engaging part of the cleat. The cleat is rotatable relative to the pedal body so as to disengage the first engaging part from the claw portion. Rotation of the cleat causes the cleat to push hook units of the retaining units rearward, thereby causing the hook units to pivot and allow a lateral disengagement of the cleat from the pedal body.

5 Claims, 5 Drawing Sheets

QUICK-RELEASE CLIPLESS PEDAL WITH TWO CLEAT ENGAGING SIDES

BACKGROUND OF THE INVENTION

1. Field of the Invention

The invention relates to a bicycle pedal, more particularly to a quick-release bicycle pedal which obviates the need for a toe clip in fastening a cyclist's shoe thereon and which has two sides that are adapted to engage releasably with a cleat which is secured on the cyclist's shoe.

2. Description of the Related Art

Devices which permit easy positioning and rapid disengagement of a cyclist's shoe on a bicycle pedal without manual intervention are known in the art. A more recent one of these devices has been disclosed in U.S. Pat. No. 5,048,369, held by the applicant. Note that the above-cited device has only one side which is adapted to engage releasably with a cleat which is secured on the cyclist's shoe. Hence, the useful life of the conventional device is relatively short since it cannot be relied upon once the cleat engaging side thereof has been damaged.

SUMMARY OF THE INVENTION

Therefore, the main objective of the present invention is to provide a quick-release bicycle pedal which obviates the need for a toe clip in fastening a cyclist's shoe thereon and which has two sides that are adapted to engage releasably with a cleat which is secured on the cyclist's shoe.

Another objective of the present invention is to provide a quick-release bicycle pedal which can minimize the risk of foot injury when engaging or disengaging the cleat thereon.

Still another objective of the present invention is to provide a quick-release bicycle pedal which is easy to assemble and disassemble and which is easy to clean.

Accordingly, the preferred embodiment of a quick-release clipless pedal of the present invention includes a cleat to be secured to a shoe sole and a pedal body to be mounted on a pedal shaft and releasably retaining the cleat. The cleat has first and second engaging parts respectively formed on front and rear ends thereof. The pedal body includes a frame portion and a tubular portion which partitions the frame portion in a transverse direction. The tubular portion receives one end of the pedal shaft. The frame portion has front and rear ends respectively formed with an opening. The pedal body further includes a pair of cleat engaging members, respectively provided on upper and lower sides of the tubular portion and respectively having a claw portion to receive releasably the first engaging part of the cleat, and a pair of retaining units revertably engaging the second engaging part of the cleat. Each of the retaining units includes: a base member having a central wall mounted uprightly in the opening of a respective one of the front and rear ends of the frame portion and a pair of end walls connected to and disposed on opposite sides of the central wall, said end walls cooperating with the central wall so as to define a pair of side openings; a pair of hook units, each of the hook units having one end pivotably mounted to the base member in one of the side openings, an opposite hook end and a rearward plate projection which extends into the respective one of the side openings; and a pair of spring members, each of the spring members being disposed in a respective one of the side openings and urging one of the plate projections upward to bias the hook end of one of the hook units to engage the second engaging part of the cleat.

The cleat is rotatable relative to the pedal body so as to disengage the first engaging part from the claw portion. Rotation of the cleat causes the cleat to push the hook units rearward, thereby causing the hook units to pivot and compress the spring members in order to allow a lateral disengagement of the cleat from the pedal body.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
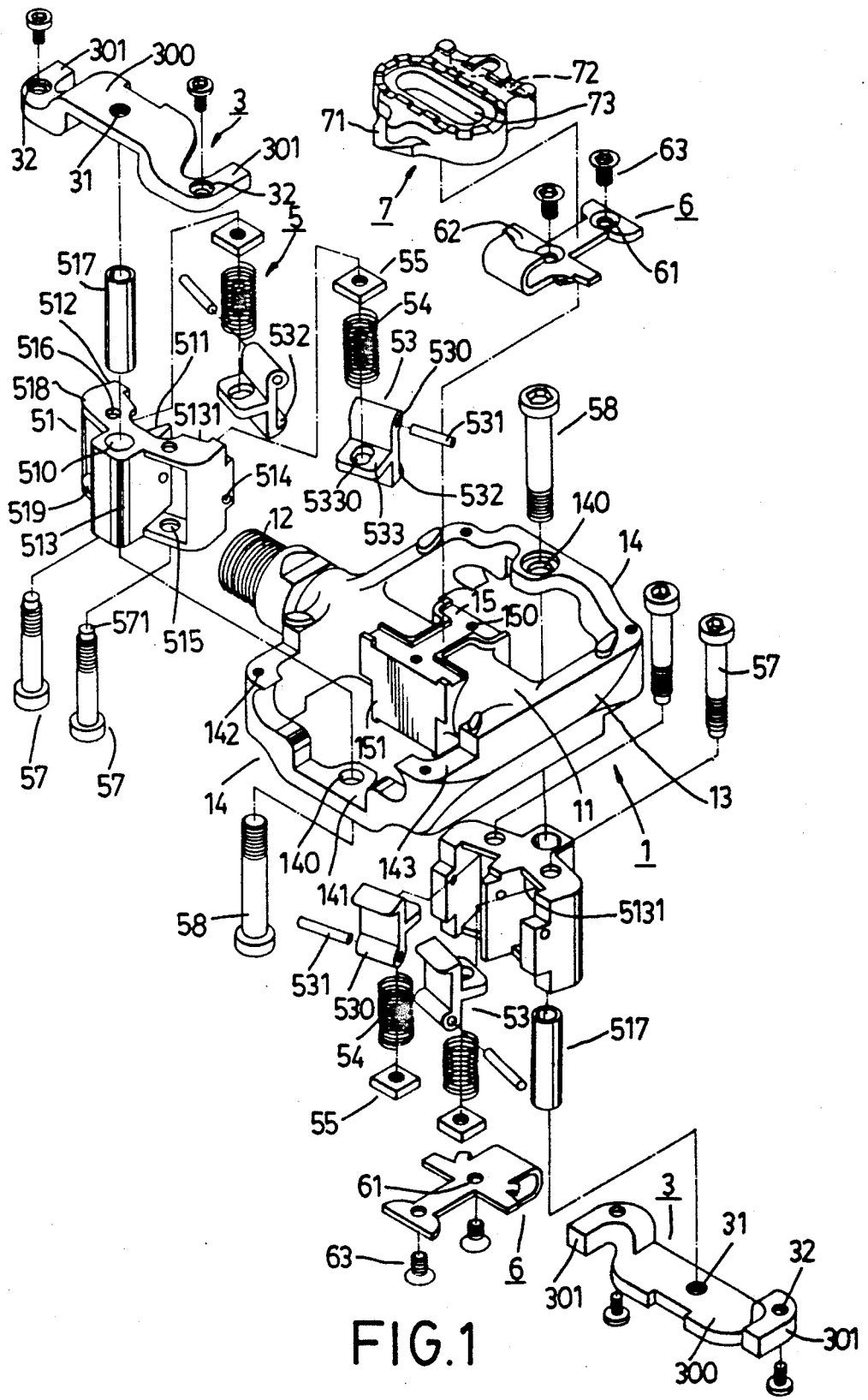
FIG. 1 is an exploded view of the preferred embodiment of a quick-release clipless pedal with two cleat engaging sides according to the present invention.
Figure 2:
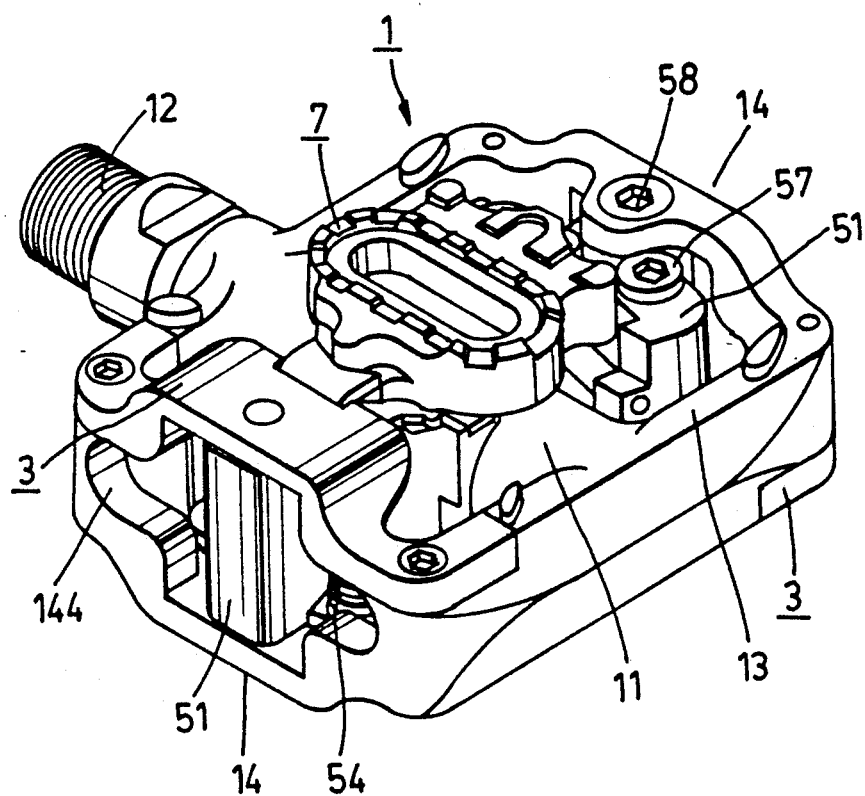
FIG. 2 is a perspective view of the preferred embodiment illustrating its assembly.

Referring to FIGS. and 2, the preferred embodiment of a quick-release clipless pedal according to the present invention is shown to comprise a pedal body (1), a pair of retaining units (5), a pair of cleat engaging members (6) and a cleat (7).

The pedal body (1) is an integrally formed piece and includes a rectangular frame portion (13) and a tubular portion (11) which partitions the frame portion (13) in a transverse direction. The tubular portion (11) receives one end of a conventional pedal shaft (12). The frame portion (13) has front and rear ends (14) which are respectively formed with an indented frame part (141). A central through hole (140) is formed on each of the frame parts (141). The two ends (143) of each of the frame parts (141) are stepped and are each formed with a screw hole (142).

The tubular portion (11) has a central connector block (151) formed thereon. The connector block (151) has upper and lower sides which are respectively formed with an I-shaped engaging groove (15). The connector block (151) is further formed with two pairs of screw holes (150) (only one pair is shown).

The front and rear ends (14) of the frame portion (13) further includes a pair of detachable frame parts (3). Each of the frame parts (3) has an indented intermediate portion (300) and two ends (301) which are respectively formed with a screw hole (31, 32). The ends (301) of the frame parts (3) are secured onto the ends (143) of the frame parts (141). The frame parts (3, 141) cooperatively define a substantially cross-shaped opening (144) on the front and rear ends (14) of the frame portion (13).

Each of the retaining units (5) includes a base member (51) which has a central wall (511) and a pair of end walls (512) disposed on opposite sides of the central wall (511). The central wall (511) is triangular in cross-section and has an enlarged rear end which is formed with an upright through bore (510). Upper and lower walls (518, 519) connect the end walls (512) and the central wall (511). The end walls (512) are parallel to a respective one of the inclined sides of the central wall (511) and cooperate with the latter to define a pair of side openings (513). The end walls (512) and the central wall (511) are further formed with aligned pivot holes (514). The side openings (513) are accessible from the front and rear ends of the base member (51) so as to facilitate periodic cleaning of the retaining units (5). The upper and lower walls (518, 519) are respectively formed with a pair of smaller and larger through holes (515, 516). A tubular shaft (517) is fittingly received in the through bore (510).

Each of the retaining units (5) further includes a pair of hook units (53). Each of the hook units (53) has a lug portion (530) on one end. A pin (531) extends through the lug portion (530) of a respective hook unit (53) and engages the base member (51) at the pivot holes (514), thereby pivotably mounting the same to the base member (51) in one of the side openings (513). Each of the hook units (53) further has a hook end (532) opposite to the lug portion (530) and a rearward plate projection (533) which extends into the respective one of the side openings (513). The plate projections (533) are respectively formed with an elongated slot (5330).

A spring member (54) is disposed in each of the side openings (513) and has one end abutting against the respective one of the plate projections (533). The other end of the spring member (54) abuts against a nut (55). Bolts (57) extend through the holes (515), the slots (5330) and into the respective spring member (54) so as to engage the nuts (55). The bolts (57) have restricted tips (571) which extend into the holes (516) of the base member (51).

Finally, bolts (58) are used so as to secure the retaining units (5) to the frame portion (13) in the openings (144). The bolts (58) extend through the holes (140), into the shaft (517) and engage the screw hole (31) in the respective detachable frame part (3).

Each of the cleat engaging members (6) is formed with a pair of through holes (61) and has a claw portion (62). The cleat engaging members (6) are received in a respective one of the engaging grooves (15). Screws (63) extend into the holes (61) and engage the holes (150) so as to fasten the cleat engaging members (6) onto the pedal body (1).

Figure 5:
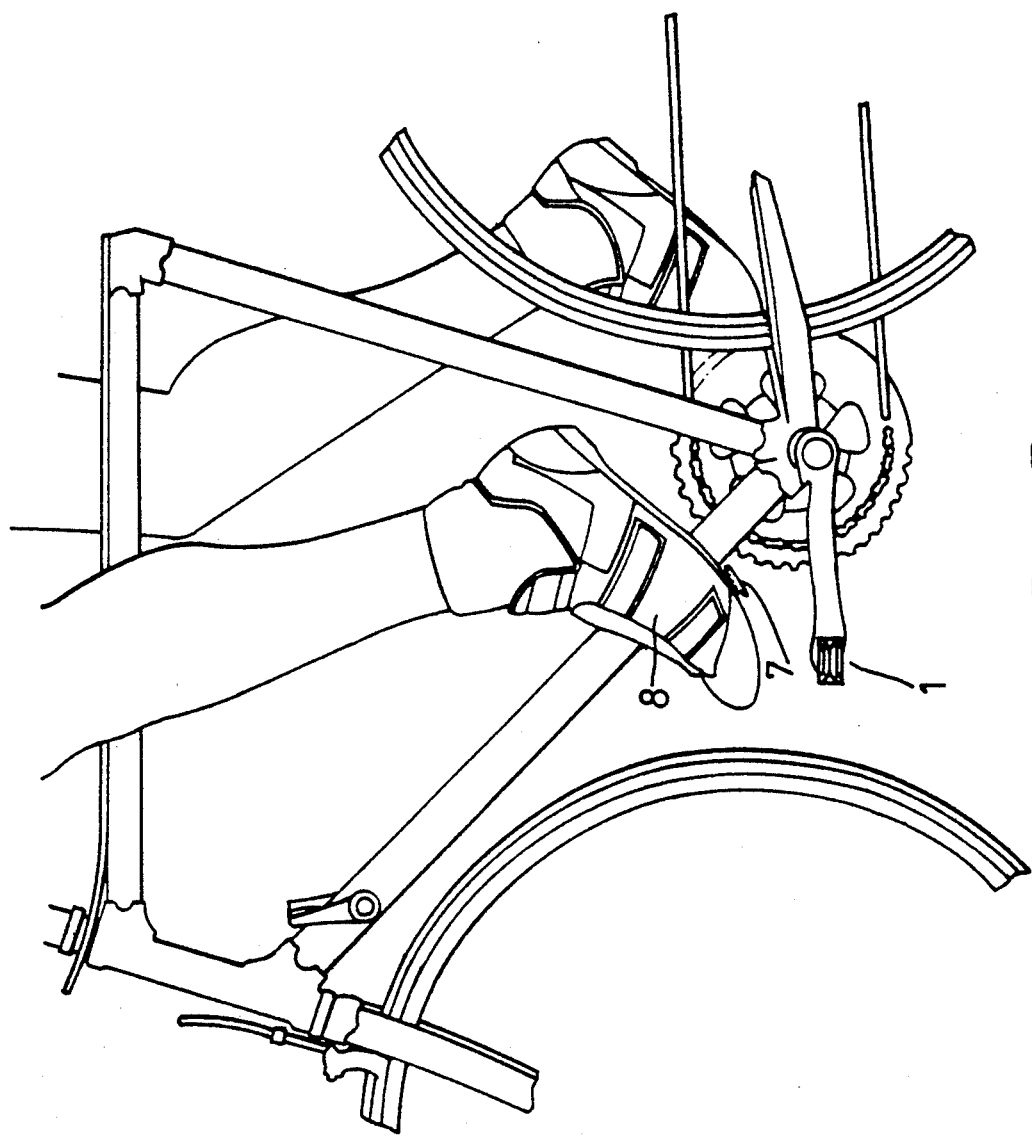
FIG. 5 is another illustration of the preferred embodiment when in use.

The cleat (7) has first and second engaging parts (71, 72) respectively formed on the front and rear ends of the same. The cleat (7) is further formed with a central through hole (73) to permit fastening of the same onto a cyclist's shoe (8) (Refer to FIG. 5). The preferred embodiment permits the cyclist's shoe to engage the front or rear side of the pedal body (1) when the preferred embodiment is installed.

Figure 3:
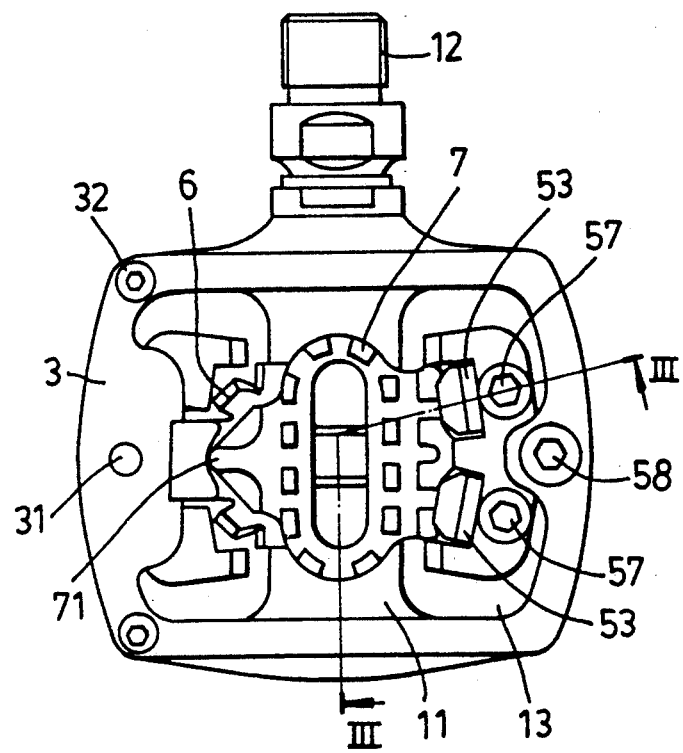
FIG. 3 is a top view of the preferred embodiment in a normal position of use.
Figure 3A:
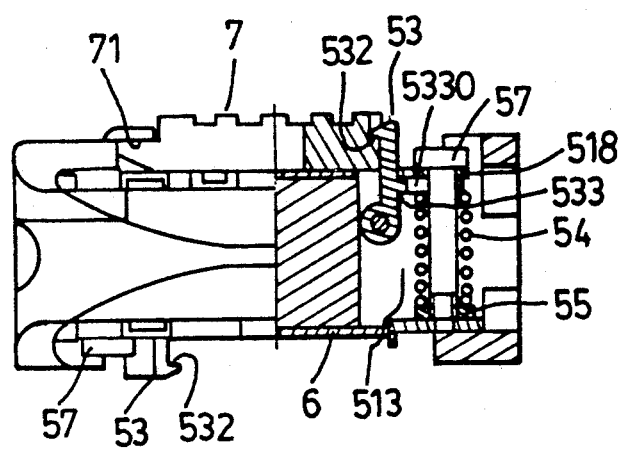
FIG. 3A is a III—III section of FIG. 3.
Figure 4:
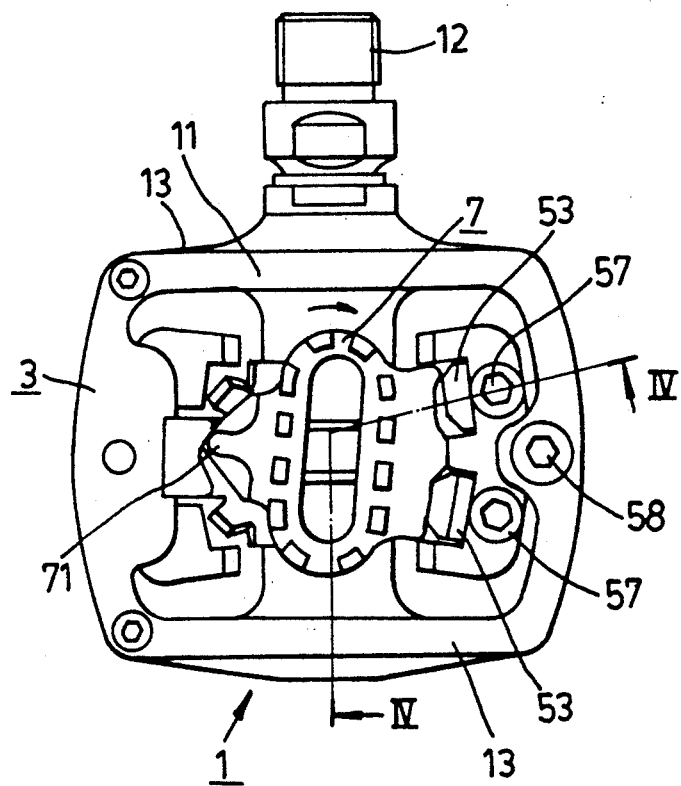
FIG. 4 is a top view of the preferred embodiment when in a position for disengaging a cleat from a pedal body of the preferred embodiment.
Figure 4A:
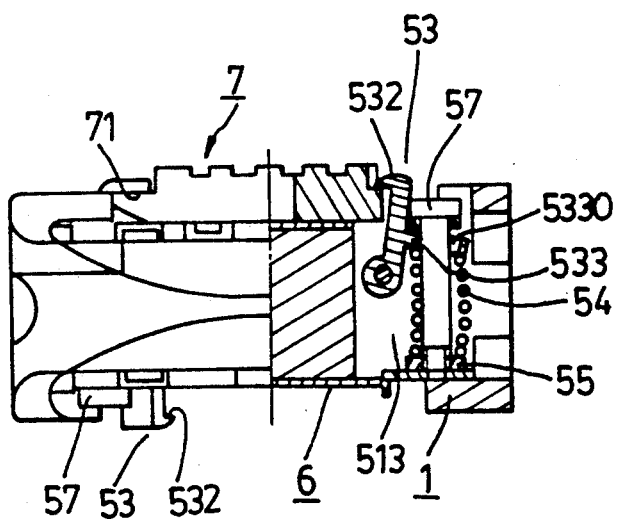
FIG. 4A is a IV—IV section of FIG. 4.

FIGS. 3 and 3A illustrate the preferred embodiment when in a normal position of use. When engaging the cleat (7) and the pedal body (1), the first engaging part (71) of the cleat (7) is maneuvered so as to engage the claw portion (62) of the cleat engaging member (6). The second engaging part (72) of the cleat (7) pushes the hook units (53) rearward until the second engaging part (72) moves past the hook units (53) and engages with the hook ends (532) of the latter.

The spring members (54) urge the respective plate projection (533) upward to bias the hook ends (532) of the hook units (53) to engage revertably the second engaging part (72) of the cleat (7). Removal of the cleat (7) from the pedal body (1) is done by rotating the cleat (7) relative to the latter so as to disengage the first engaging part (71) from the claw portion (62). Rotation of the cleat (7) causes the cleat to push the hook units (53) rearward, thereby causing the hook units (53) to pivot about the pins (531) and compress the spring members (54) in order to allow a lateral disengagement of the cleat (7) from the pedal body (1). Removal of the cleat (7) from the pedal body (1) causes the spring members (54) to expand and return the hook units (53) to the respective former positions.

Note that the bolts (57) are operable so as to adjust the distance between the plate projections (533) and the nuts (55) and vary the degree of compression of the spring members (54) to vary correspondingly the amount of applied force which is needed so as to disengage the second engaging part (72) from the hook units (53).

The retaining units (5) are pivotably mounted onto the pedal body (1) so as to permit limited rotation of the former (about 4°), thereby minimizing the risk of foot or kneecap injury when engaging or disengaging the cleat (7) from the pedal body (1).

The preferred embodiment is ideal for use in cycling races. If one side of the pedal body (1) is damaged and cannot effectively engage the cleat (7), the pedal body (1) is simply rotated so as to permit the other side of the pedal body (1) to receive the cleat (7). The useful life of the pedal body (1) is therefore prolonged.

Note also that the preferred embodiment is easy to assemble and disassemble. The spring members (54) are exposed in the side openings (513) to facilitate cleaning of the same in order to remove dirt which has collected thereon.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A quick-release clipless pedal including a cleat to be secured to a shoe sole and a pedal body to be mounted on a pedal shaft and releasably retaining said cleat, wherein the improvement comprises:

said cleat having first and second engaging parts respectively formed on front and rear ends thereof;

said pedal body including a frame portion and a tubular portion which partitions said frame portion in a transverse direction, said tubular portion receiving one end of the pedal shaft, said frame portion having front and rear ends respectively formed with an opening;

said pedal body further including a pair of cleat engaging members respectively provided on upper and lower sides of said tubular portion and respectively having a claw portion to receive releasably said first engaging part of said cleat, and a pair of retaining units revertably engaging said second engaging part of said cleat, each of said retaining units including: a base member having a central wall mounted uprightly in said opening of a respective one of said front and rear ends of said frame portion and a pair of end walls connected to and disposed on opposite sides of said central wall, said end walls cooperating with said central wall so as to define a pair of side openings; a pair of hook units, each of said hook units having one end pivotably mounted to said base member in one of said side openings, an opposite hook end and a rearward plate projection which extends into the respective one of said side openings; and a pair of spring members, each of said spring members being disposed in a respective one of said side openings and urging one of said plate projections upward to bias said hook end of one of said hook units to engage said second engaging part of said cleat;

said cleat being rotatable relative to said pedal body so as to disengage said first engaging part from said claw portion, rotation of said cleat causing said cleat to push said hook units rearward, thereby causing said hook units to pivot and compress said spring members in order to allow a lateral disengagement of said cleat from said pedal body.

2. The quick-release clipless pedal as claimed in claim 1, wherein said tubular portion has a central connector block formed thereon, said connector block having a pair of engaging grooves respectively formed on upper and lower sides of said connector block, each of said cleat engaging members being mounted in one of said engaging grooves.

3. The quick-release clipless pedal as claimed in claim 1, wherein:

each of said plate projections is formed with a slot;

each of said retaining units further comprises a nut disposed on one end of said spring member opposite to the respective one of said plate projections and a bolt extending through said slot, into said spring member and engaging said nut, said bolt being operable so as to adjust the distance between said plate projection and said nut and vary the degree of compression of said spring member.

4. The quick-release clipless pedal as claimed in claim 1, wherein said central wall has a rear end pivotably mounted to said frame portion.

5. The quick-release clipless pedal as claimed in claim 1, wherein each of said front and rear ends of said frame portion has an indented frame part and a detachable frame part which cooperates with said indented frame part so as to form said opening.

* * * * *